J. W. LITTLE.
FEATHER-DUSTERS.
No. 195,873. Patented Oct. 2, 1877
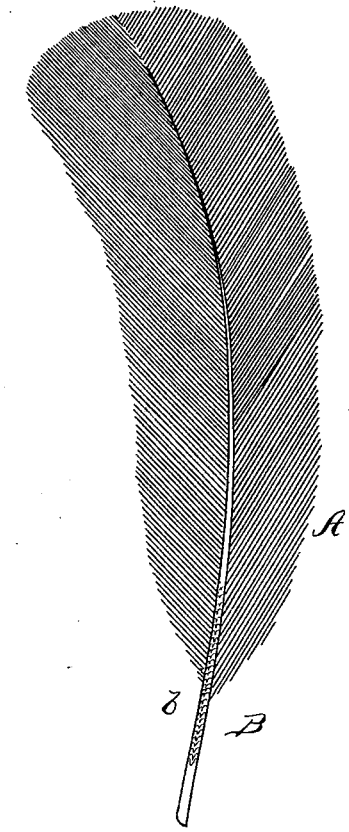
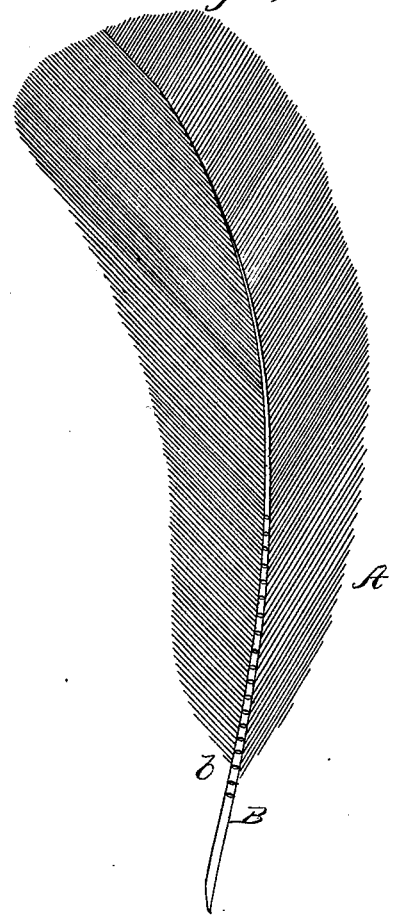

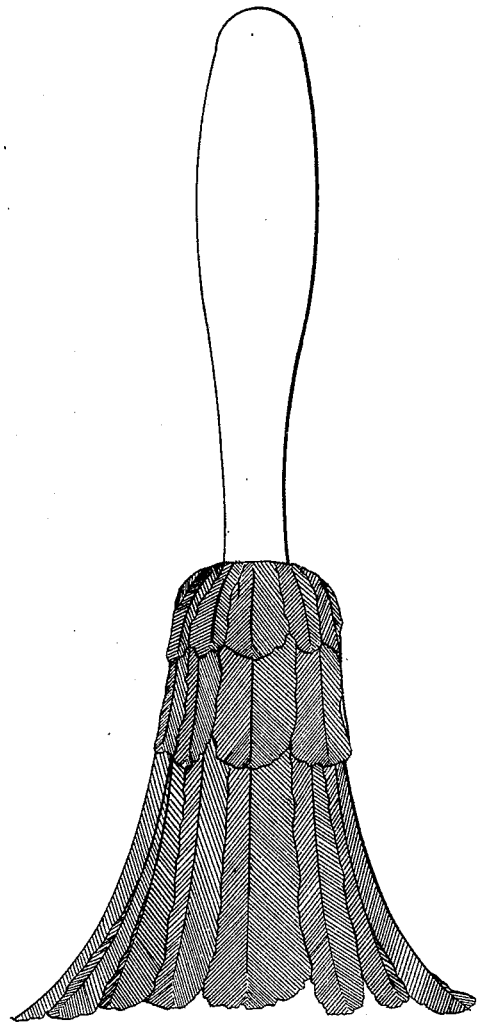

UNITED STATES PATENT OFFICE.

JOHN W. LITTLE, OF MUNCIE, INDIANA, ASSIGNOR TO CORNELIA LITTLE, OF SAME PLACE.

IMPROVEMENT IN FEATHER DUSTERS.

Specification forming part of Letters Patent No. 195,873, dated October 2, 1877; application filed May 29, 1877.

*To all whom it may concern:*

Be it known that I, JOHN W. LITTLE, of Muncie, in the State of Indiana, have invented certain new and useful Improvements in Feather Dusters; and I do hereby declare that the following is a full, clear, and exact description thereof, reference being had to the accompanying drawings, and to the letters of reference marked thereon, which form part of this specification.

My invention relates to feather dusters; and it consists in cutting or notching the stiff or under side of the stems of the feathers for the purpose of rendering them pliable and suitable for use in dusting-brushes, as will be hereinafter more fully set forth.

In order to enable others skilled in the art to which my invention appertains to make and use the same, I will now proceed to describe its construction and operation, referring to the annexed drawing, in which—

Figure 1 is a view of a feather cut partly through, and Fig. 2 is a view of a feather notched according to my invention. Fig. 3 is a view of a whole feather duster.

A represents the feathers for making feather dusters, and B is the stem of such feathers. The stem B is cut, as shown at *b b*, in the stiff or under part of the stems, but not deep enough so as to injure the strength of the tough outside portion of the stem. These cuts *b b* may be made directly across, or slanting, or diagonally; or notches may be made in the stem instead of simple cuts. By this means the feathers are rendered more pliable, while they nevertheless retain their original strength, and become thus more suitable for use in dusting-brushes.

After the stems of the feathers have been thus cut or notched, they may be crushed, if desired.

But I am aware that feathers have been crushed without having been previously cut or notched; hence I do not claim the crushing of the feathers by itself as being my invention. Neither do I claim splitting feathers, as I am aware such is not new.

By my invention more strength is left in the feathers to keep their shape and position in a duster, and the feathers will not split longitudinally, as do the split feathers.

The feathers are put together in the usual manner, or in any desired manner, to form a duster, and connected to a handle, substantially as shown in Fig. 3.

I am fully aware the mere crushing of the stems of feathers is not new, and I do not claim such, broadly, as being my invention; but by first cutting or notching the stems and then crushing them a more flexible and pliable brush is obtained.

Having thus fully described my invention, what I claim as new, and desire to secure by Letters Patent, is—

1. Feathers having their stems cut or notched, for the purposes herein set forth.
2. As a new article of manufacture, a duster composed of feathers having their stems cut or notched, substantially as herein set forth.

In testimony that I claim the foregoing as my own I affix my signature in presence of two witnesses.

JOHN W. LITTLE.

Witnesses:
COLUMBUS O. HOOD,
WILLIAM L. LITTLE.